UNITED STATES PATENT OFFICE.

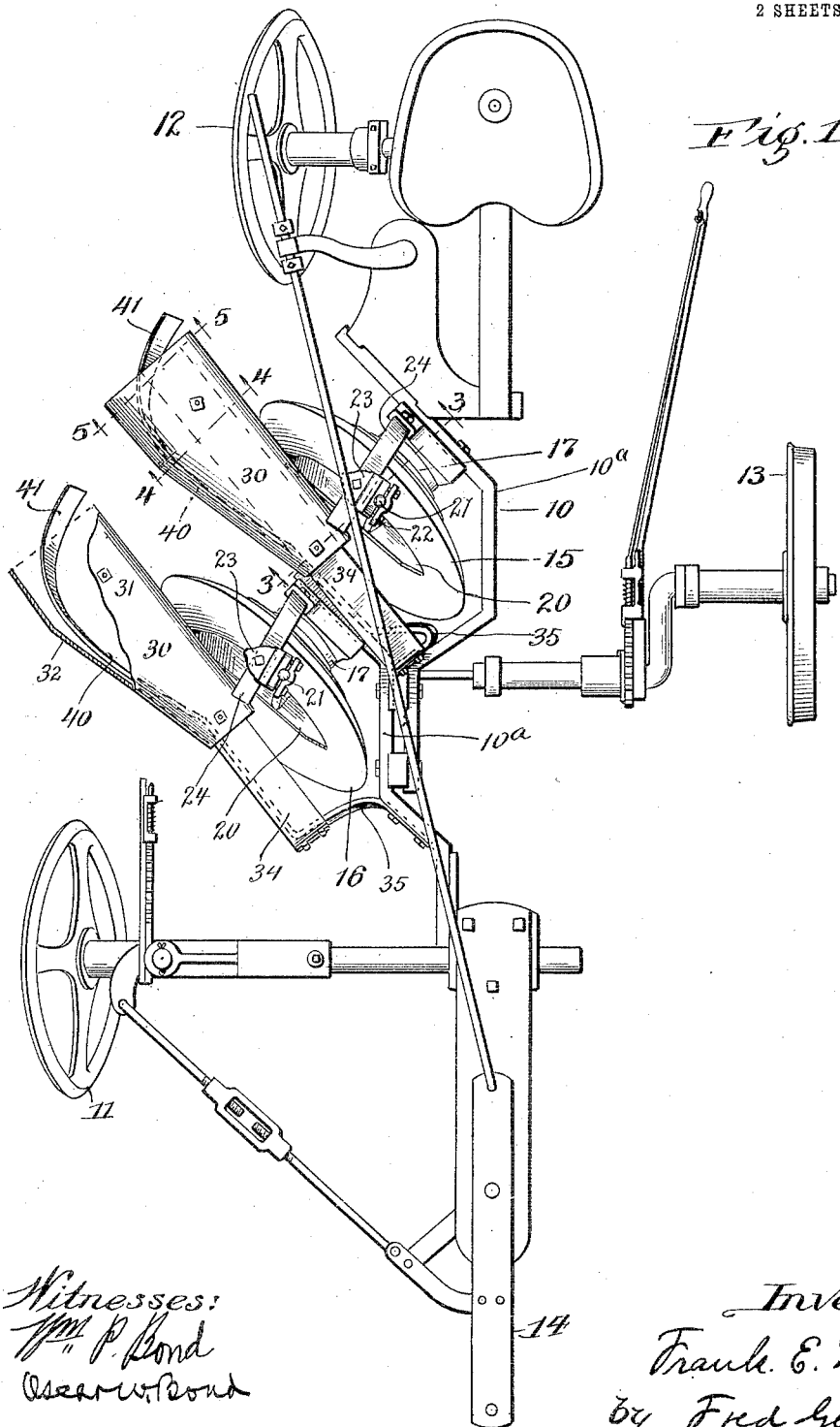

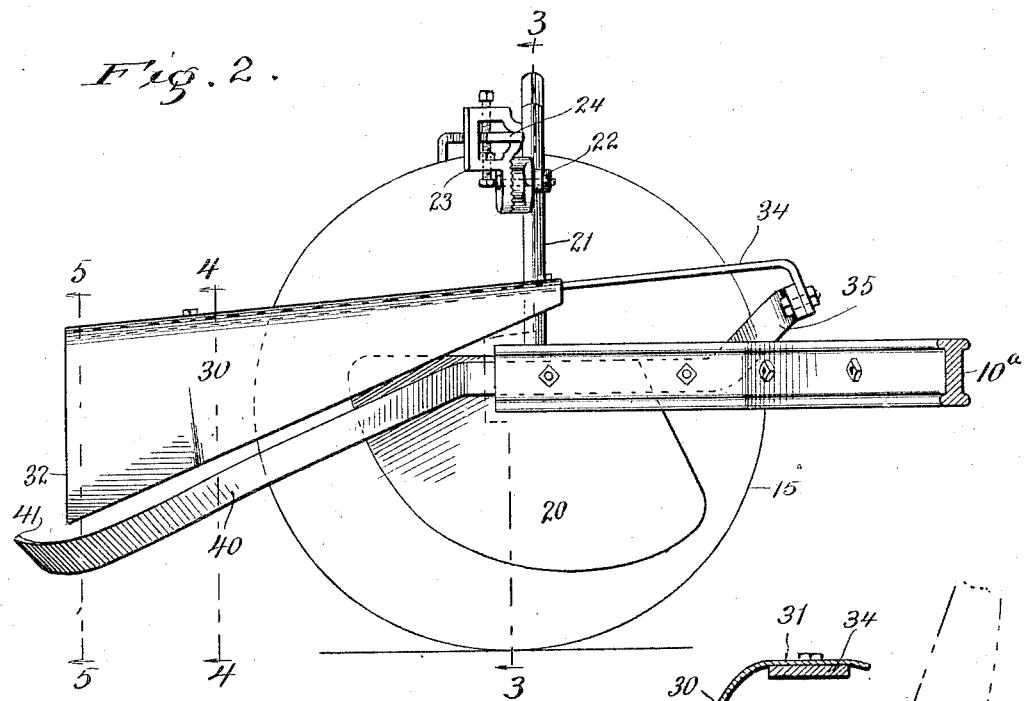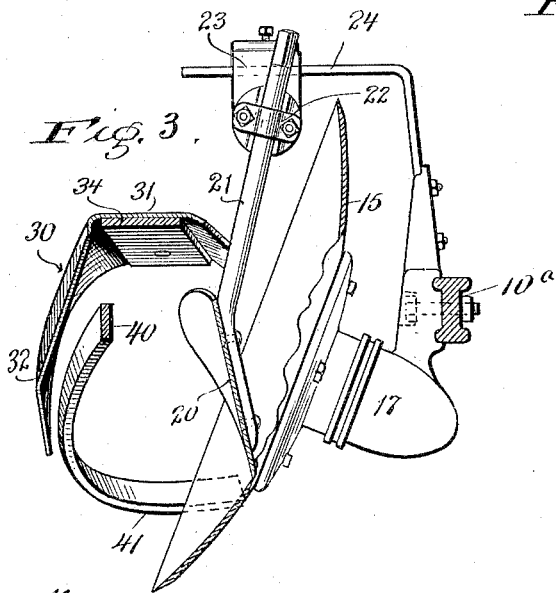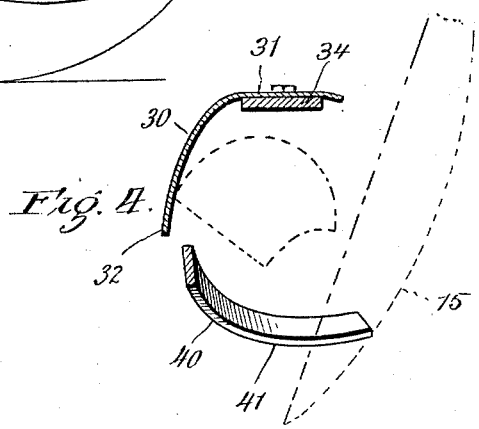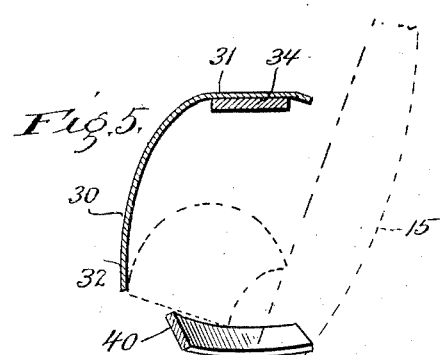

FRANK E. DAVIS, OF LA CROSSE, WISCONSIN, ASSIGNOR OF ONE-HALF TO LA CROSSE PLOW COMPANY, OF LA CROSSE, WISCONSIN, A CORPORATION OF WISCONSIN.

PLOW.

1,076,871.

Specification of Letters Patent.

Patented Oct. 28, 1913.

Application filed October 28, 1907. Serial No. 399,479.

*To all whom it may concern:*

Be it known that I, FRANK E. DAVIS, a resident of La Crosse, in the county of La Crosse and State of Wisconsin, have invented certain new and useful Improvements in Plows, of which the following is a full, clear, and exact description.

The invention relates to plows, and more particularly to the delivery of the furrow-slice cut and lifted by the plow, to the ground or a previously cut furrow.

The invention designs to associate with a plow, means for delivering the turned furrow-slice cut by the plow in uniform and definite position and condition on the ground, usually in a previously cut furrow. In plowing or opening up the soil it is a desideratum to deliver the furrow-slice in substantially true inverted position, so that the roots of the weeds and grass will be inverted and exposed to insure and facilitate decay and put them in condition to fertilize the soil and to avoid growth or development thereof; also to deliver the respective furrow-slices in the previously cut furrows without unduly overlapping them.

Heretofore, in plows, inversion and delivery of the furrow-slice was effected by the mold-board, the position and condition of the slice when delivered onto the ground being dependent upon the impetus and direction imparted to the furrow-slice by the mold-board or turning-means. Such operation has, however, been found to be deficient in different soils, or different conditions of the same soil, because different treatments are necessary for the different soils, or for the same soil under different conditions. For example, in light, loose, or mucky soil it is frequently desired to pulverize the soil as thoroughly as possible, this being effected by shaping the mold-board to lift and pitch the furrow-slice abruptly. In heavier soils a more gradual lifting and turning movement is necessary to effect the proper delivery of the furrow-slice. When operating in sod, it is usually desired to turn the furrow-slice and lay it on the ground in inverted position, and leave it in condition to attain early decay of the sod and exposure of the roots to avoid further growth and development of the weeds and grass in the sod. An exceedingly slow lifting and turning movement is more effective in delivering a sod furrow-slice in desired position and condition on the ground.

In practice heretofore the delivery of the furrow-slice in desired position and condition has been varied in mold-board plows by shaping the mold-board so that the furrow-slice would be delivered to the ground in substantially inverted position. However, a mold-board shaped to properly deliver a furrow-slice or soil of one character, *e. g.*, soft or sandy soil, would fail to correspondingly deliver a furrow-slice of soil different in character and furthermore, the impetus of the furrow-slice would frequently cause it to be broken up or disintegrated to such an extent that grass and weeds would continue their growth by reason of the cultivation incident to such disintegration, instead of facilitating death or decay as desired. Because of the different soils and different conditions of the same soil, the shaping of the mold-board or turning means to effect the desired delivery has in a measure failed and has been insufficient to insure this desired result. In practice it has been found that a plow which would both properly pitch and deliver furrow-slices of the lighter soils would not properly pitch and deliver the heavier soils and tough sods in satisfactory manner. Furthermore, the same soil in different conditions would not be properly delivered. These conditions have not, to my knowledge, been successfully met in mold-board plows. In disk-plows the difficulties encountered in controlling the furrow-slice to effect proper delivery thereof in inverted position are greater, because the concavo-convex disk usually employed to cut and deliver the furrow-slice must be set in proper position or angle to secure proper penetration and any variation from the required angle or angles would not result in proper penetration of the soil. In some instances the shape and angle of the disk are relied upon to turn the furrow-slice, but in practice it has been found desirable to place a mold-board scraper in engagement with the concave face of the disk to further deflect or turn the furrow-slice from the course given to it by the disk itself and also to remove the adhering soil from the disk. In the disk-plow, being thus circumscribed in its disposition of the furrow-slice, it has been found more difficult to successfully turn and control the slice so that soils of different character and in different conditions would be properly turned and delivered to the surface of the ground.

The invention designs, primarily to provide a plow with means by which the furrow-slice is controlled after it has been lifted and turned by the plow or its mold-board, so that variations in condition or character of the soil will not materially vary the delivery of the furrow-slice as desired, and to definitely deliver the soil in correct position and condition.

With these objects in view, the invention consists in the several novel features hereinafter set forth and more particularly defined by claim at the conclusion hereof.

In the drawings: Figure 1 is a plan of a disk-plow embodying the invention. Fig. 2 is a side elevation of one of the disks and controlling-means for the furrow-slice. Fig. 3 is a section taken on line 3—3 of Figs. 1 and 2. Fig. 4 is a section taken on line 4—4 of Figs. 1 and 2. Fig. 5 is a similar view taken on line 5—5 of Figs. 1 and 2.

The invention is illustrated as applied to a disk-plow of usual construction comprising a suitable frame 10 usually formed of members or sections 10$^a$, front and rear furrow-wheels 11 and 12, a land-wheel 13, a draft-clevis 14, and concavo-convex disks 15 and 16, each of which is revolubly mounted in suitable journals 17 which are connected to the frame in suitable manner. Disks 15 and 16 are, as well understood in the art, set at an angle to the line of draft and with respect to the vertical to penetrate the soil and cut a furrow-slice and to lift it upwardly and turn it outwardly as the disks are drawn forwardly through the soil. Usually a scraper 20 is associated with each of the disks, and engages the concave face thereof to cut or remove the soil from the disks at such point as may be desired and its form is somewhat similar to that of a mold-board to coöperate with the disk in turning the furrow-slice outwardly. The mold-board scraper 20 is secured to a standard 21 which is adjustably secured to an adjustable bracket 22 whereby the relative position of the scraper and disk may be varied, as well understood in the art. The fixed member 23 of bracket 22 is secured to an arm 24 which is extended downwardly and secured to one of the members of the main frame. The parts thus far described may be of any suitable and usual construction, it being understood that the disk and scraper serve as means for cutting, lifting and turning the furrow-slice.

The invention provides a device for controlling the furrow-slice after it has been cut and turned by the plow, one of such devices being associated with each plow, and is illustrated as embodied in a disk gang plow, each disk of which is provided with a controlling-device which consists of a shield or guide 30 comprising a wall 31 disposed to overlie the furrow-slice in transit from the disk or turning-means, this wall being also extended downwardly on its outer side as at 32. The shield is inclined outwardly and rearwardly with respect to the line of draft and is disposed so that the partially inverted furrow-slice in transit from the disk will be received thereby and will impinge against the shield. By this arrangement the shield is disposed approximately in the path of travel of the furrow-slice in transit from the disk and scraper, and resultantly, the furrow-slice projected by the disk and scraper will encounter and be retarded and guided by the shield. The impact of the furrow-slice against the shield causes the impetus of the slice to be restrained or retarded so that it will be gradually and definitely guided and inverted and delivered in desired position and condition upon the ground. The shield or guide 30 is secured to a flexible supporting-bar 34 so it is yieldingly supported and free to yield vertically to any undue pressure of the furrow-slice against the wall of the shield to prevent clogging, or in event the furrow-slice is enlarged to permit the furrow-slice to pass along the shield without excessive restraint. A flexible supporting-bar 34 is secured at its front end to a bar 35 which in turn is bolted to one of the members 10$^a$ of the main frame of the plow. The wall 32 of the shield extends outwardly and downwardly as illustrated in the drawings to guide the furrow-slice so that it will be restrained from lateral travel, and to successfully guide slices of different characters to properly dispose them on the ground and prevent lateral overthrow of the slice.

A bar 40 is disposed to lie beneath shield 30 and extends rearwardly, downwardly and outwardly approximately parallel to the outer wall of the shield to catch the outer portion of the lower face and sustain the outer portion of the furrow-slice as it is passing beneath the shield. This bar guides and limits the turning of the slice to prevent excessive turning and definitely controls and sustains it so it will be delivered face downward. Any tendency of the slice to turn over on its edge or any excessive twisting thereof is overcome thereby. Adjacent the rear portion of the shield, bar 40 is bent inwardly to form an arm 41 to catch and sustain the substantially inverted furrow-slice as it is being delivered to the ground and said arm also exercises a restraining influence on the inner edge of the slice. Arm 41 is also bent or inclined so its side will be disposed to facilitate the passage of the slice thereover. This bar may be constituted by an extension of the bar 35 to which the shield or supporting-bar 34 is secured. This bar is slightly yielding so that the rear working end may yield slightly when unduly strained by the furrow-slice. This bar, by sustaining the inner edge of the slice guides it so the inverted face of the slice will be directed by said bar to a definite inverted position on the ground. If the slice is not turned sufficiently then arm 41 upholds the inner edge of the slice to guide it so the slice will be delivered into correct position face downward on the ground.

The operation of the improved controlling-means for the furrow-slice will be as follows: When the plow is in operation the furrow-slice cut and lifted by the concavo-convex disk will be turned into an upwardly and outwardly course by the disk and mold-board scraper. On leaving the mold-board scraper and disk, the furrow-slice will be projected upwardly and outwardly and the acquired impetus will cause it to continue its turning movement. In transit from the turning and lifting-means the furrow-slice will encounter and be guided by the wall of shield 30 which will retard or restrain the furrow-slice to prevent either excessive outward or upward movement and tend to effect an even delivery thereof. When it leaves the shield the undesired impetus of the slice will have been largely overcome and the slice will be substantially inverted in close proximity to the ground and delivered to the ground in desired position more definitely than would occur if the furrow-slice were not restrained in transit from the turning-means. While the furrow-slice is passing under and within the shield-wall the outer or front edge of the furrow-slice usually passes over and along the side of bar 40, which serves to sustain and guide said edge-portion of the furrow-slice to hold the slice against excessive turning. As the inverted furrow-slice reaches the rear-portion of the shield the rear curved end of bar 40 sustains and guides the rear or inner edge-portion of the inverted furrow-slice and if the slice is insufficiently turned when disposed over said end of the bar it will uphold the inner edge of the slice sufficiently to permit the outer edge to gravitate so the slice will be delivered properly. If the slice in transit from the turning-means has insufficient impetus to pass along the shield, bar 40 will restrain the outward movement of the slice and the rear portion of the bar will guide it to the ground. Resultantly, by the controlling, restraining and sustaining-means aforesaid, the furrow-slice is definitely controlled to cause it to be delivered in desired position and condition on the ground despite any variation in the course of the slice resulting from different conditions of the soil or operation or construction of the turning and lifting-means.

The construction set forth is one which makes it possible to readily attach the improved device to a plow-frame of usual construction and particularly to a disk-plow or gang-plow.

The invention is not to be understood as restricted to the precise structure illustrated and described but may be modified within the scope of the appended claims without departing from the spirit and scope of the invention.

Having thus described the invention, what I claim as new and desire to secure by Letters Patent is:

1. In a plow, the combination of means for cutting and turning a furrow-slice, a guide disposed and extended to limit outward movement of the slice, and a stop having a surface which is disposed inwardly of said guide and has a surface which intersects the slice path to limit the turning of the slice and to guide it downwardly to the ground.

2. In a plow, the combination of means for cutting and turning a furrow-slice, guiding means disposed and extended to limit the upward and outward movement of the slice, and a stop having a surface which is disposed inwardly of said guide and has a surface which intersects the slice-path and to limit the turning of the slice and to guide it downwardly to the ground.

3. In a plow, the combination of means for cutting and turning a furrow-slice, a guide disposed and extended to limit outward movement of the slice, and a stop having a surface which is disposed inwardly of said guide and has a surface which intersects the slice-path to limit the turning of the slice and to guide it downwardly to the ground, said stop being extended forwardly sufficiently to arrest the slice which does not strike the guide.

4. In a plow, the combination of means for cutting and turning a furrow-slice, guiding means disposed and extended to limit the upward and downward movement of the slice, and a stop having a surface which is disposed inwardly of said guide and has a surface which intersects the slice-path to limit the turning of the slice and to guide it downwardly to the ground, said stop being extended forwardly to arrest a slice independently of the guiding-means.

5. In a plow, the combination of means for cutting and turning a furrow-slice, and a guide for limiting upward movement of the slice, said guide being separate from the cutting means and yieldingly sustained so its position with respect to the cutting and turning-means may vary.

6. In a plow, the combination of means for cutting and turning a furrow-slice, and a guide for limiting outward movement of the slice, said guide being yieldingly sustained so its position with respect to the cutting and turning-means may vary.

7. In a plow, the combination of means for cutting and turning a furrow-slice, and a guide for limiting upward and outward movement of the slice, said guide being yieldingly sustained so its position with respect to the cutting and turning-means may vary.

8. In a plow, the combination of means for cutting and turning a furrow-slice, a guide for limiting the outward movement of the slice, and a stop having a surface extending into, and formed to intersect, the path of a turning slice and formed to extend under and positively arrest the edge portion of a slice, said guide and said stop being both extended rearwardly to guide the slice until its delivery to the ground.

9. In a plow, the combination of rotary means for cutting and turning a furrow-slice, a guide for limiting the outward movement of the slice, and a stop having a surface extending into and formed to intersect the path of a turning slice and formed to extend under and positively arrest the edge portion of a slice, said guide and said stop being both extended rearwardly to guide the slice until its delivery to the ground.

10. In a plow, the combination of means for cutting and turning a furrow-slice, supporting means for the cutting and turning means, and means supported by said supporting means for engaging the inner edge-portion of the substantially inverted furrow-slice to guide that portion of the slice as it is being delivered to the ground.

11. In a plow, the combination of means for cutting and turning a furrow-slice, supporting means for the cutting and turning means, means supported by said supporting means for limiting the turning of the slice projected from the turning-means, and means for guiding the inner edge-portion of the substantially inverted slice to restrain the slice if it is insufficiently turned.

12. In a plow, the combination of means for cutting and turning a furrow-slice, a guide for limiting the turning of the slice, said guide being extended rearwardly and downwardly and inwardly at its rear to support the inner edge-portion of the slice.

13. In a plow, the combination of means for cutting and turning a furrow-slice, and a yieldable guide for engaging the inner edge-portion of the slice to restrain it.

14. In a plow, the combination of a rotary disk for cutting and turning a furrow-slice, a guide disposed and extended longitudinally to overlie and limit the upward movement of slices projected to different points by the disk, and means for limiting the turning of the slice.

15. In a plow, the combination of a disk for cutting and turning a furrow-slice, a guide disposed to overlie and limit the movement of a slice which is projected forwardly and laterally from the disk, and means for limiting the turning of the slice.

16. In a plow, the combination of a disk for cutting and turning a furrow-slice, a guide extended longitudinally and comprising a wall disposed to overlie the slice as it is projected either forwardly or laterally, and a wall for limiting the outward movement of the slice, and means for sustaining the slice in transit to the ground.

17. In a plow, the combination of a disk for cutting and turning a furrow-slice, and a guide separate from the disk sustained so its position with respect to the disk may vary, and means underlying the slice for sustaining it in transit to the ground.

18. In a plow, the combination of a disk for cutting and turning a furrow-slice, and means for engaging the inner edge-portion of the inverted slice to guide the slice.

19. In a plow, the combination of a disk for cutting and turning a furrow-slice, means for engaging the inner edge-portion of the inverted furrow-slice to guide that portion of the slice as it is being delivered to the ground, and means for limiting the turning of the slice at its outer edge.

20. In a plow, the combination of a disk for cutting and turning a furrow-slice, and a guide for limiting the turning of the slice, said guide being extended rearwardly and downwardly and inwardly at its rear to support the inner edge-portion of an insufficiently turned slice.

21. In a plow, the combination of a disk for cutting and turning a furrow-slice, and a yieldable guide for engaging the inner edge-portion of the slice to restrain it.

FRANK E. DAVIS.

Witnesses:
C. W. DICKINSON,
M. M. BERGANS.